United States Patent [19]
Hodgetts

[11] Patent Number: 5,915,911
[45] Date of Patent: *Jun. 29, 1999

[54] PICKUP TRUCK UNLOADER

[75] Inventor: Graham L. Hodgetts, Baden, Pa.

[73] Assignee: Loadhandler Industries, Inc., Cranberry, Pa.

[ * ] Notice: This patent is subject to a terminal disclaimer.

[21] Appl. No.: 08/700,387

[22] PCT Filed: Jul. 15, 1994

[86] PCT No.: PCT/US94/07816

§ 371 Date: Oct. 29, 1996

§ 102(e) Date: Oct. 29, 1996

[87] PCT Pub. No.: WO95/23106

PCT Pub. Date: Aug. 31, 1995

Related U.S. Application Data

[63] Continuation-in-part of application No. 08/004,965, Jan. 15, 1993, Pat. No. 5,340,266.

[30] Foreign Application Priority Data

Feb. 23, 1994 [CA] Canada .................................. 2116270

[51] Int. Cl.⁶ .................................................. B65G 67/24
[52] U.S. Cl. ............................................................. 414/527
[58] Field of Search ................................... 414/507, 509, 414/510, 527, 529, 539, 679; 198/688.1, 847

[56] References Cited

U.S. PATENT DOCUMENTS

| 49,006 | 7/1865 | Stevens | 414/527 |
|---|---|---|---|
| 2,595,395 | 5/1952 | Lavelle et al. | 414/527 |
| 2,788,136 | 4/1957 | Herbert et al. | 414/510 |
| 3,443,703 | 5/1969 | Matsumoto | 414/510 |
| 3,978,996 | 9/1976 | Oltrogge | 414/527 |
| 4,277,220 | 7/1981 | Wiley | 414/539 |
| 4,629,390 | 12/1986 | Burke | 414/527 |
| 4,705,161 | 11/1987 | Gozdiff | 198/847 |
| 4,749,325 | 6/1988 | Hodgetts | 414/527 |
| 4,760,971 | 8/1988 | Hodgetts | 242/67.1 |
| 4,842,471 | 6/1989 | Hodgetts | 414/527 |
| 4,892,456 | 1/1990 | Hodgetts | 414/527 |
| 4,900,609 | 2/1990 | Arnold | 428/163 |
| 5,156,518 | 10/1992 | VanMatre | 414/527 |
| 5,196,092 | 3/1993 | Stigberg | 162/358.4 |
| 5,238,537 | 8/1993 | Dutt | 162/358.4 |
| 5,340,266 | 8/1994 | Hodgetts | 414/527 |

*Primary Examiner*—David A. Bucci
*Attorney, Agent, or Firm*—Webb Ziesenheim Logsdon Orkin & Hanson, P.C.

[57] ABSTRACT

An apparatus for conveying materials from a vehicle flat bed having a back end opposite sides spaced a distance apart and a tailgate (14) hinged to the bed for movement between an open position and a closed position. The apparatus includes a roller (100) having a length substantially equal to the length of the tailgate (14) and a flat flexible belt (50) having an underside adapted to slide along a sliding surface in the bed, wherein the belt (50) attaches to the roller (100). The length of the belt (50) is sufficient so that it can extend from the roller (100) into at least a portion of the flat bed. The belt (50) is adapted to be wound onto the roller (100). The roller (100) attaches to the tailgate (14) by a bracket (200, 202) and strap arrangement (280). The strap arrangement (280) includes a tourniquet buckle (294). A crank handle (156) is provided for rotating the roller (100).

8 Claims, 7 Drawing Sheets

PICKUP TRUCK UNLOADER

This is a continuation-in-part of application Ser. No. 08/004,965 filed Jan. 15, 1993, now U.S. Pat. No. 5,340,266.

BACKGROUND OF THE INVENTION

1) Field of the Invention

This invention relates generally to handling materials in vehicle beds and, more particularly, to an apparatus which operates to unload a wide variety of materials from the cargo areas of vehicles, such as pickup trucks.

2) Description of the Prior Art

Landscape gardeners, construction workers, horse breeders, park keepers and most individuals, at some time in their lives, need to move bulk materials in quantities that are too large to carry but too small to be moved economically in a dump truck. The common way of moving such a quantity is to load it onto a pickup truck 10. As shown in FIGS. 1 and 2, the pickup truck 10 includes a cab 11, flat bed 12 and a tailgate 14. A C-shaped bumper 15 is positioned below the tailgate 14. The tailgate 14 is attached to the flat bed 12 via foldable tailgate supports 16 passing through respective sides 18 and 20 of the pickup truck 10 which are spaced a distance apart. The supports 16 permit the tailgate 14 to move between open and closed positions. When the tailgate 14 is in a closed position, the pickup truck bed 12 can hold material between the tailgate 14, sides 18 and 20, a front end 21 and a back end 22.

Among the types of materials that are commonly carried in the cargo area of the pickup truck are granular materials, such as sand, gravel, dirt and grain; building materials, such as lumber, dry wall panels, siding panels, bricks, stone and roofing materials; containers, such as boxes, drums and cartons; waste materials, such as brush, tree clippings, scrap, tires and demolition debris; machinery, such as air compressors and other relatively heavy pieces of equipment; and miscellaneous objects, such as firewood, animal feed, hay bales, tools and other items. In many cases, unloading of the truck bed is a difficult and time-consuming activity. For example, unloading of hay or firewood by hand or unloading of sand, gravel, earth, mulch or manure with a shovel can take a considerable amount of time and requires substantial physical labor. Heavier objects are also difficult to unload, particularly those that are carried in the back end 22 of the cargo area near the cab 11 and must be moved near the tailgate 14 before they can be unloaded.

To unload in such a manner is labor intensive, time-consuming and in some cases dangerous because of the need to climb up on the load. It would be beneficial if the load could be unloaded quickly and completely and require a fraction of the time and effort now used, without the need to climb up on the truck.

One such method is to tilt the bed of the vehicle and dump the load. This requires a special structural design which provides a pivot point or hinge for the tilting bed and a lifting mechanism such as an electric or hydraulic hoist. Such designs result in costs which are disproportionally high when compared with the cost of the standard pickup truck bed itself and too high for all but those users whose use of the mechanism is frequent enough to justify its expense.

U.S. Pat. No. 3,978,996 to Oltrogge and U.S. Pat. No. 4,629,390 to Burke disclose devices that facilitate the unloading of pickup truck beds. However, the devices discussed in these patents have complicated designs and would be relatively expensive to manufacture because of the number of components required.

Accordingly, it is an object of my invention to provide an unloading device for a pickup truck which is inexpensive and easy to install and permits the vehicle to be quickly and completely unloaded with minimum labor.

SUMMARY OF THE INVENTION

I have invented a pickup truck unloader for conveying materials from a vehicle flat bed having a back end, opposite sides spaced a distance apart and a tailgate hinged to the bed for moving between an open position and a closed position. The tailgate includes a length, a width, an upper end and a lower end, the lower end spaced a distance from the bed, and two outer surfaces. The pickup truck unloader includes a roller, a flat flexible belt, a device for attaching the roller to the tailgate and positioning the roller adjacent the tailgate upper end and a device for rotating the roller. The roller includes a first end and a second end and has a length substantially equal to the length of the tailgate. The roller can be made of a cylindrically shaped shaft. The flat flexible belt has an underside for sliding along a sliding surface in the bed and attaches to the roller. The belt is of sufficient length to be extended from the roller into at least a portion of the flat bed and is adapted to be wound onto the roller. The device for attaching the roller to the tailgate and positioning the roller adjacent to the tailgate upper end includes an attaching bracket pivotally attached to the first end of the roller and also can include a flexible strap member. The strap member attaches to the attaching bracket and includes a buckling end and a buckle end wherein a buckle attaches to the buckle end. The strap member is adapted to pass under the lower end of the tailgate through the space between the tailgate and the bed so that the roller can be attached to the tailgate and positioned adjacent the upper end of the tailgate by buckling the buckle end of the buckle. A bearing, such as a self-aligning frictionless bearing, attaches to the attaching bracket and rotatably attaches to the first end of the roller. The device for rotating the roller includes a crank handle that enables an operator to rotate the handle about a longitudinal axis passing through the roller whereby any object or material placed upon the flexible belt when extended into the flat bed area can be moved toward the roller when the roller is rotated. Rotation of the roller causes the belt to be wound onto the roller.

The unloader can further include a low friction underlayment for placement on the bed so that the underlayment is sandwiched between the bed and the flexible belt, when the flexible belt is extended in the flat bed. The underlayment can be made of plastic such as high density polyethylene, ultra high molecular weight polyethylene or polypropylene. Preferably, the coefficient of friction between the underside of the belt and a surface upon which the belt slides in the bed is approximately 0.25 or less, or more preferably approximately 0.18. Preferably, the underside of the belt is made of woven nylon, polyester, or polypropylene fibers which can include a primary coating of resorcinol resin and a secondary coating of polyurethane having a hardness of greater than sixty on the Shore hardness "A" scale. Alternatively, the underside could include a coating of PVC or acrylic resin having a hardness of greater than eighty on the Shore hardness "A" scale.

Preferably, the roller is adapted to be positioned on the tailgate so that when the tailgate is in an open position, a horizontal tangent to an upper surface of the roller is approximately between 0.125 inch to 0.375 inch from an upper surface of the underlayment.

The strap member can include a first strap segment having a first end and a second end. The first end of the first segment attaches to the first end of the attaching bracket. A second segment has a first end and a second end. The first end of the second segment attaches to a second end of the attaching bracket. The buckle is attached to the second end of the first segment and the second end of the second strap segment is adapted to be received by the buckle. The buckle can be a self-locking buckle, such as a tourniquet buckle or a cam buckle.

The device for attaching the roller to the tailgate and positioning the roller adjacent to the tailgate upper end can further include a mounting plate having a length greater than the thickness of the upper end of the tailgate. The mounting plate includes an upper surface and a lower surface wherein the lower surface is adapted to rest on or be positioned adjacent to an upper end of the tailgate. The mounting plate also includes a first end and a second end with a hole passing through the mounting plate adjacent the mounting plate first end and a second hole passing through the mounting plate adjacent the mounting plate second end. The device further includes a first L-shaped bracket and a second L-shaped bracket. Each of the L-shaped brackets includes a first leg and a second leg depending therefrom. Each first leg includes a hole passing therethrough and each second leg includes a slot located near a lower end thereof. Two fasteners pass through respective mounting plate holes and L-shaped bracket holes attaching the mounting plate to the respective L-shaped bracket so that the second legs of the first L-shaped bracket and the second L-shaped bracket are adapted to abut against or be positioned adjacent to respective outer sides of the tailgate and the first legs of the first L-shaped bracket and the second L-shaped bracket are adapted to depend away from the tailgate. The first end of the first strap segment passes through the slot of the first L-shaped bracket thereby forming a first strap segment attaching section and the first end of the second strap segment passes through the slot of the second L-shaped bracket thereby forming a second strap segment attaching section.

At least one of the first hole of the mounting plate and the hole of the first L-shaped bracket first leg are elongated so that the distance between the first L-shaped bracket second leg hole and the second L-shaped bracket second leg hole can be varied and the attaching bracket can accommodate different tailgate thickness.

A cushion can be attached to at least one of a lower surface of the mounting plate, an inner surface of the second leg of the first L-shaped bracket and an inner surface of the second leg of the second L-shaped bracket.

An open-ended substantially U-shaped unloading device cover can be provided that is adapted to be secured to the roller. The cover defines a cavity for receiving a portion of the roller and a portion of the belt wound on the roller. The cover can be removable and is made of a polymeric material. My invention is also an ornamental design of the cover.

DESCRIPTION OF THE DRAWINGS

FIG. 7b is a side view of the mounting plate shown in FIG. 7a;

DESCRIPTION OF THE PREFERRED EMBODIMENTS

Figure 2:
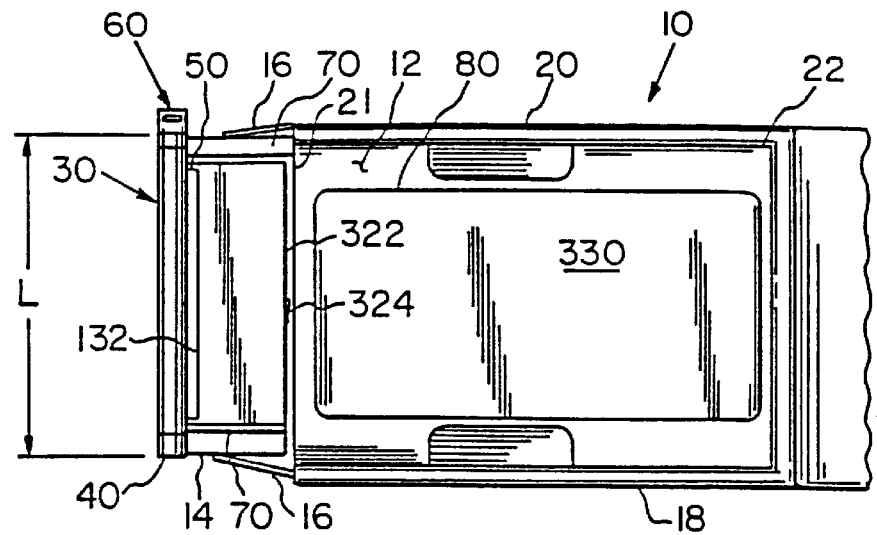
FIG. 2 is a top view of a portion of the pickup truck shown in FIG. 1 including the unloading device made in accordance with the present invention.
Figure 1:
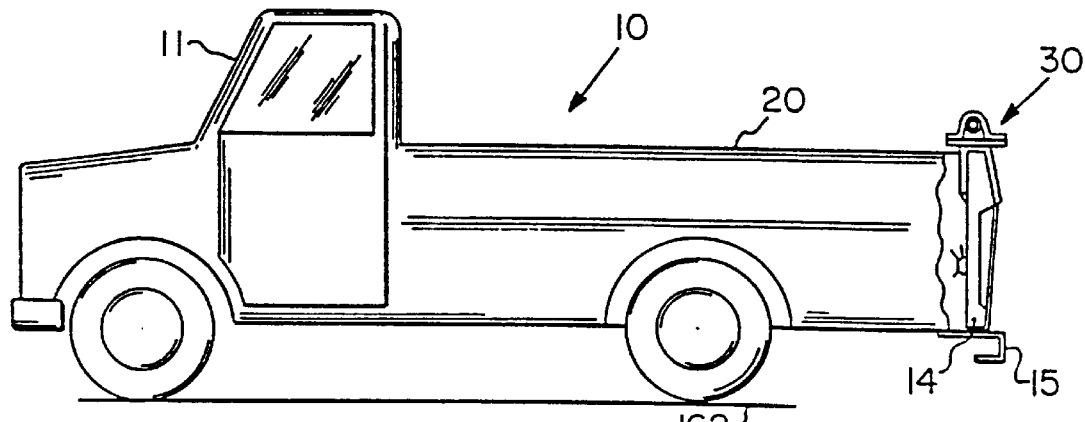
FIG. 1 is a side view of a portion of a pickup truck having the unloading device made in accordance with the present invention.
Figure 3:
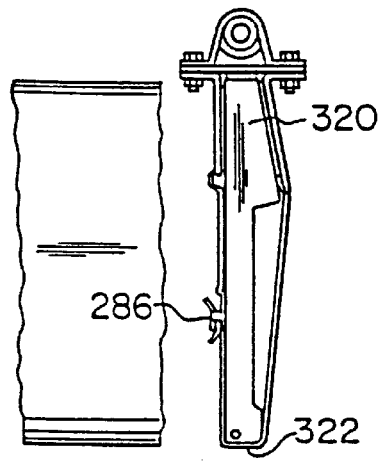
FIG. 3 is a partial side view of the pickup truck of FIG. 1 with the tailgate in a closed position and having the unloading device made in accordance with the present invention.

The structure of a pickup truck unloader 30 in accordance with the present invention is shown in FIGS. 1–11 and described below. The unloader 30 is adapted to attach to the tailgate 14 of a pickup truck 10. The unloader 30 includes a roller assembly 40, a belt 50, a driving arrangement 60 and an attaching arrangement 70. An optional removable underlayment 80 is positioned on the pickup truck bed 12.

As shown in FIGS. 3–6, the roller assembly 40 includes a substantially cylindrical roller 100 made of a steel shaft and is substantially equal to the length "L" of the tailgate 14. Preferably, the roller 100 is approximately two inches in diameter and has a ⅛ inch thick wall for tailgate lengths "L" of up to 72 inches. The roller 100 includes a first end 102 and a second end 104. Each end includes internal threads that threadably receive couplings 105 and 106. Each coupling 105 and 106 has an internally threaded bore that threadably receives cylindrical metal shafts 107 and 108, respectively. Shafts 107 and 108 each have threaded ends and a smooth middle portion outer bearing surface 109. The outer diameter of shafts 107 and 108 can be about one inch having a ⅛ inch thick wall. Middle portion of shaft 107 is rotatably or pivotally received by a first bearing unit 110. The bearing unit 110 includes a frictionless and self-aligning bearing 112, such as a ball bearing arrangement. One such bearing unit 110 is the Fafnir R.P.B. Bearing unit manufactured by the Torrington Company which is owned by Ingersoll Rand Corporation. Frictionless bearings are well known in the art and are bearings having low friction and are also known as low friction bearings. The frictionless bearing 112 is contained in a housing 114 having a top section 115a and bottom section 115b. The housing has two oppositely positioned holes 116a and 116b. A second bearing unit 120 receives middle portion of shaft 108. The second bearing unit 120 is the same as the first bearing unit 110 and includes a frictionless self-aligning bearing 122 contained in a housing 124 having a top section 125a and a bottom section (not shown) and two holes (of which only one hole 126a is shown) wherein the holes are positioned on opposite sides of the housing 124.

The belt 50 is substantially rectangular in shape and is preferably at least equal to the length of the flat bed 12 and more preferably about 25% longer than the flat bed 12. The belt width is approximately the width of the flat bed 12. The belt 50 includes a first end 130 attached to the roller 100 and a second free end 132. The belt preferably is made of a high strength plastic material. Preferably, an underside 134 of the belt 50 should be made of woven nylon or polyester fibers with no coating or alternatively with enough coating to protect the fibers from abrasion but not to increase the coefficient friction above approximately 0.25 between the belt underside 134 and a surface of the bed 12 upon which the belt is adapted to slide. More preferably, the coefficient of friction should be approximately 0.18 between the underside 134 and a high density polyethylene surface. Such a coating can be a primary coating of resorcinol resin and a secondary coating of polyurethane having a Shore hardness on the "A" scale of sixty or above and preferably above eighty. Alternatively, the coating can be PVC or acrylic resin having a Shore "A" hardness above eighty and preferably above ninety. The belt should stretch less than 1% when a force of twenty pounds per inch of width is applied. Alternatively, the belt can be made of polypropylene woven sheet, with or without a coating.

The driving arrangement 60 includes a substantially cylindrical coupling 150 having ends 151a and 151b. End 151a has internal threads and threadably receives the outer threaded end of shaft 108 which extends beyond the second bearing unit 120. Alternatively, the connection can be with a weld. An elongated slot 154 passes through a side cylindrical surface 153 of the coupling 150. A rectangular crank handle 156 having a rectangular cross section is adapted to be received in the slot 154. The crank handle 156 has a first end 158 adapted to be received in the elongated slot 154 and a second end 160. A gripping extension 161 depends from second end 160. The crank handle 156 should be strong enough to sustain a leverage of about one hundred foot pounds of torque applied to the roller 100. Further, the crank handle should be long enough so that an average person can easily apply enough force on the crank handle 156 to yield one hundred foot pounds of torque against the roller 100. The mechanical advantage sustained by the crank handle 156 should be at least 24:1 and preferably 30:1 or greater. Preferably, the crank handle 156 should have an adjustable length, say fifteen inches to thirty inches so that an operator need only exert a force of forty to eighty pounds against the crank handle end 160 through the gripping extension 161 to sustain the preferred roller torque. An adjustable crank also allows the operator to shorten the length to accommodate variations in height of the open tailgate 14 above the ground 162. This is achieved by the handle 156 sliding into slot 154 of coupling 150 to the point where optimum cranking torque is obtained consistent with the height of the tailgate 14 above the ground.

The attaching arrangement 70, shown in FIGS. 5–9, includes two sections 170 and 172 wherein section 170 attaches to first bearing unit 110 and section 172 attaches to second bearing unit 120. Each section includes a rectangularly shaped flat mounting plate bracket 180, as shown in FIGS. 7a and 7b. Bracket 180, which has a length greater than the thickness "t" of an upper portion 183 of the tailgate 14, is preferably made of metal and includes an upper surface 184, a lower surface 186, a first end 188 having a hole 190 passing therethrough and a second end 192 having a hole 194 passing therethrough.

Figure 8:
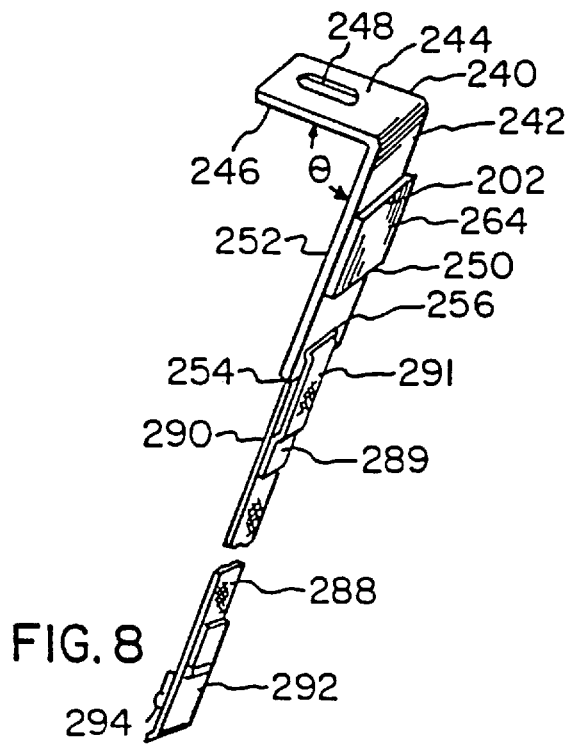
FIG. 8 is a perspective view of a first L-shaped bracket and strap and buckle arrangement of the unloading device of FIG. 1.
Figure 9:
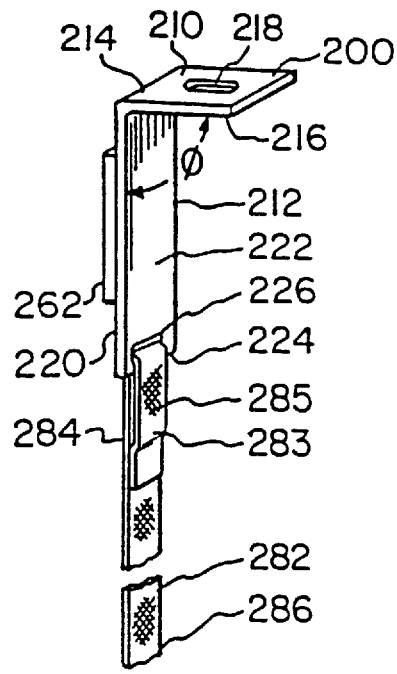
FIG. 9 is a perspective view of a second L-shaped bracket and strap arrangement of the unloading device of FIG. 1.

Each attaching arrangement section 170 and 172 also includes two metal L-shaped brackets 200 and 202, as shown in FIGS. 8 and 9, that attach to cross bracket 180. L-shaped bracket 200 includes a first leg 210 and an integral depending second leg 212. The first leg 210 includes an upper surface 214, a lower surface 216 and an elongated hole 218. Second leg 212 includes an inner surface 220, an outer surface 222 and a lower end 224 having a rectangular slot 226. Surfaces 216 and 222 are angularly spaced apart by an angle $\phi$ which is approximately 90°. L-shaped bracket 202 includes a first leg 240 and an integral second leg 242 depending therefrom. Leg 240 includes an upper surface 244 and a lower surface 246 and an elongated hole 248. Second leg 242 includes an inner surface 250, an outer surface 252 and a lower end 254 having a rectangular slot 256. Surfaces 246 and 252 are angularly spaced apart by and angle $\theta$ which is an acute angle. Cushions 260, 262 and 264 made out of resilient material, such as rubber or synthetic foam, attach to lower surface 186 of cross bracket, inner surface 220 of L-shaped bracket second leg and inner surface 250 of L-shaped bracket second leg. The cushions 260, 262, 264 provide protection for the tailgate finish from the bracket arrangement 70. Alternatively, the cushions 260, 262, 264 can be eliminated or the cross bracket 180 and L-shaped brackets 200 and 202 can be dipped in a cushion-like polymeric material such as liquid PVC, known as "plastisol".

Each attaching section 170 and 172 includes a strap arrangement 280 that includes a flexible first elongated strap 282 having an end 283 passed through slot 226. End 283 is attached, by stitching, onto a lower portion 284 of the strap 282 forming a loop 285 attached to the bracket 200. The first strap 282 includes a free end 286 adapted to be received by a buckle. The strap arrangement 280 also includes a second strap 288 having an end 289 passed through a slot 256. End 289 is attached, by stitching, onto a lower portion 290 of the strap 288 forming a loop 291 attached to bracket 202. The strap 288 includes a buckling end 292 having a self-locking buckle such as a spring-loaded cam buckle or tourniquet buckle 294 attached thereto. One such tourniquet buckle, which is well-known in the art, is manufactured by ITW Nexus, Inc. of Wood Dale, Ill. Preferably, the straps 280 and 288 are made of a synthetic woven fabric material such as nylon, polyester or polypropylene. Alternatively, bracket 200 can receive strap 288 and bracket 202 can receive strap 280.

Installation of unloader 30 onto a pickup truck tailgate is as follows. First attaching sections 170 and 172 are attached to respective housings 114 and 124. Specifically, respective cross bracket upper surfaces 184 abut against lower surfaces of housings 114 and 124. L-shaped bracket upper surfaces 214 and 244 abut against respective cross bracket lower surface 186 so that a U-shaped tailgate receiving recess 298 is defined by cross bracket lower surface 186 and second leg inner surfaces 220 and 250, which are spaced a distance apart from each other. Legs 210 and 240 extend outwardly from recess 298. A fastening arrangement 300 passes through respective sets of aligned holes 116a, 190 and 218; 116b, 194 and 248; 126a, 190 and 218; and the housing hole of housing 124, not shown, and holes 194 and 248. Each fastening arrangement 300 includes a bolt 302 having a bolt head 304 and a threaded shaft 306 attached thereto. The head 304 rests on the cross bracket upper surface 184 and the threaded shaft 306 passes through a respective set of above-identified holes. A washer 308 is received by shaft 306. Washer 308 abuts a respective first leg lower surface 216 or 246. A nut 310 is threadably received by shaft 306 so that washer 308 is positioned between first leg lower surfaces 216 or 246 and nut 310. Initially, nut 310 should be loosely received by shaft 306.

Next, legs 212 and 242 are moved apart a distance greater than the thickness "t" of the upper portion 183 of the tailgate 14. Elongated holes 218 and 248 permit the movement of the legs 210 and 240 so that the distance between the legs 210 and 240 can be varied and, thus, the unloader 30 can accommodate various thicknesses of different tailgates 14. The respective sections 170 and 172 are placed over the tailgate upper portion 183 so that sides thereof are received by respective tailgate receiving recesses 298 and a top end 320 of tailgate 14 rests on cushion 360 so that roller 100 and mounting plate bracket are positioned above or adjacent to top end 320. Legs 212 and 242 are pushed toward each other until cushions 262 and 264 contact outer tailgate surface 314 and inner tailgate surface 316, respectively, so that legs 210 and 212 are positioned adjacent to surfaces 314 and 316. Then, respective fastening arrangements 300 are tightened, thereby holding brackets 180, 200 and 202 in place. In many instances, this is sufficient to hold the unloader in place without the need of straps 282 and 288, so long as sections 170 and 172 are sufficiently secured on to the tailgate to permit operation of the unloader as discussed below. In this case, the unloader would be held in place by the frictional forces of the squeezed cushions 262 and 264 coacting with the tailgate surfaces 314 and 316. For each section 170 and 172, the first strap free end 286 is then passed under a tailgate lower end 322 through a gap or space 324 defined between end 322 and flat bed 12, when the tailgate 14 is in the open position. The free end 286 is received by and passed through the tourniquet buckle 294 and pulled until the straps 282 and 288 are taut. The buckle 294 is then closed thereby clamping first strap 282. It is important that during installation the belt 50 is wound completely on roller 100.

The underlayment 80 is then placed in the flat bed 12 and is rectangularly shaped and substantially the same shape as the interior of the truck bed. Preferably, the underlayment is made of a plastic sheet having a low coefficient of friction such as high density polyethylene, ultra high molecular weight polyethylene or polypropylene. Preferably, the coefficient of friction between an upper surface of the underlayment 80 and a lower surface of the belt 50 is 0.25 or less, more preferably 0.18. Alternatively, underlayment 80 can be made of a co-extrusion member having a low coefficient friction material on the upper surface that coacts with the belt 50 and having a rubber compound with a high coefficient of friction ($\mu$) on steel (above 0.5) for a bottom surface (not shown), which coacts with the truck bed and prevents the bottom surface from slipping on the truck bed when the belt 50 is slid across the upper surface of the belt 50. One such upper surface can be high density polyethylene and one such bottom surface can be "Kraton 722" manufactured by Phillips Petroleum company. One such co-extruder is Primex Plastics Corporation, 1235 No. "F" Street, Richmond, Ind. The underlayment 80 may not be necessary if the truck bed is coated with a material having a low coefficient of friction. Removal of the unloader 30 and the underlayment 80 is easily accomplished by reversing the above steps. Further, the unloader 30 and underlayment 80 can be sold as a kit for attachment to truck 10.

Figure 10:
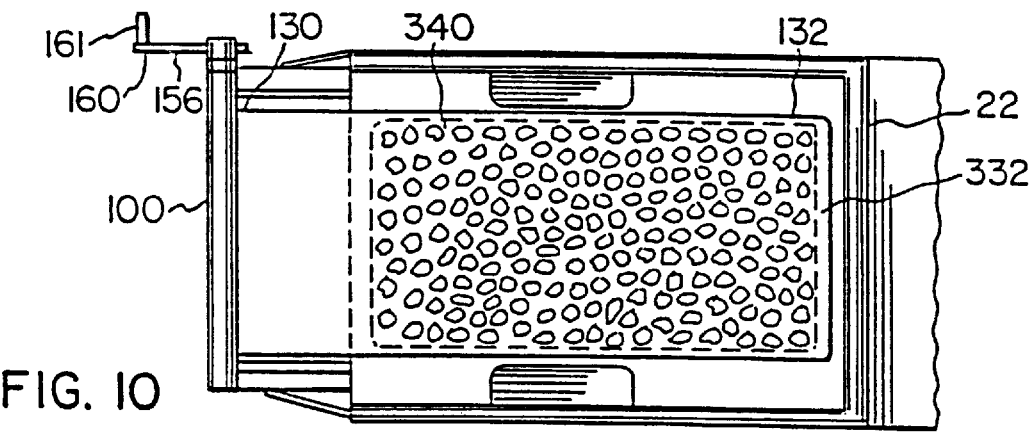
FIG. 10 is a top view of a pickup truck having an unloader belt fully extended in a truck bed with bulk material resting on the belt of the unloading device of FIG. 1.

The operation of the pickup truck unloader is straightforward and efficient. First, after the unloader 30 is installed, the underlayment 80 is placed in the flat bed 12. Preferably, the roller 100 is positioned on the tailgate 14 in such a way that when the tailgate 14 is in the open position, a horizontal tangent to an upper surface of the roller 100 is approximately 0.125 inch to 0.375 inch from an upper surface 330 of the underlayment 80. Then, the belt 50 is unwound by the operator grasping the second end 132 of the belt 50 and pulling the belt 50 toward the back end 22. In this manner, the underside 134 of the belt 50 rests on the upper surface 330 of the underlayment 80, which is sandwiched between the truck bed floor and the belt 50. A bulk material 340, such as wood chips, can now be deposited onto a top surface 332 of the belt 50 with the tailgate 14 in a closed position, as shown in FIG. 10. The bulk material 340 is delivered to its destination. Then, the tailgate 14 is opened in a normal manner.

Figure 4:
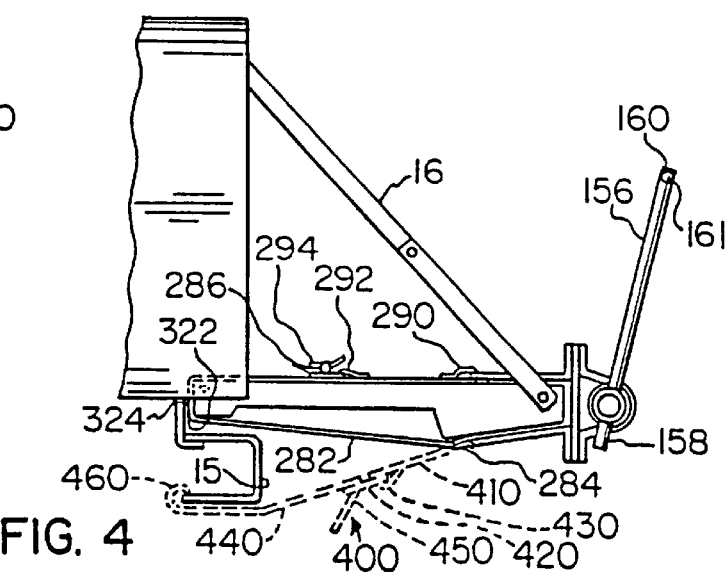
FIG. 4 is a partial side view of the pickup truck of FIG. 1 with the tailgate in an open position and having the pickup truck unloading device.
Figure 5:
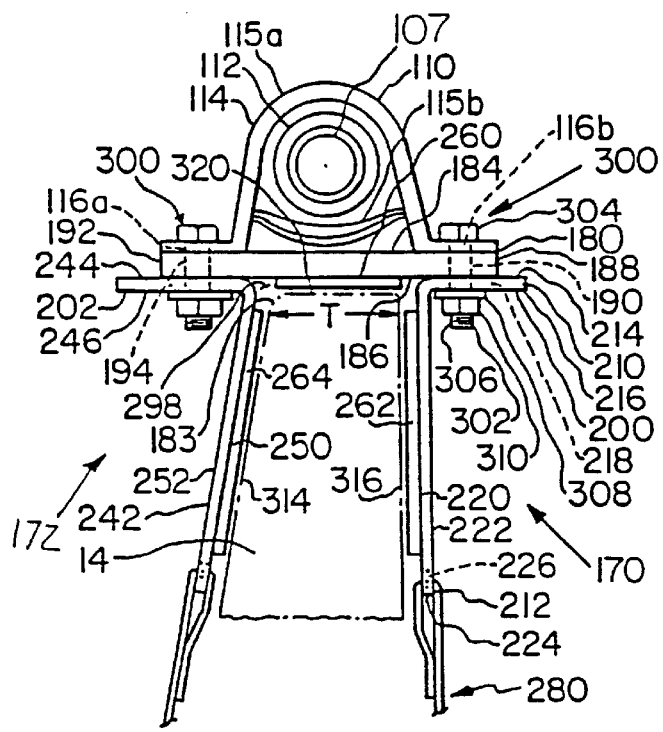
FIG. 5 is an enlarged partial side view of the unloading device of FIG. 1 attached to an upper portion of the tailgate.
Figure 7A:
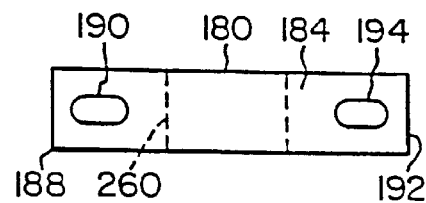
FIG. 7a is a top view of a mounting plate of the unloading device of FIG. 1.
Figure 7B:
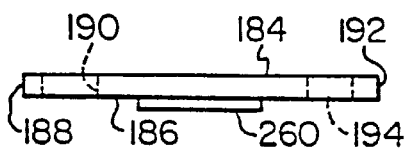
Figure 6:
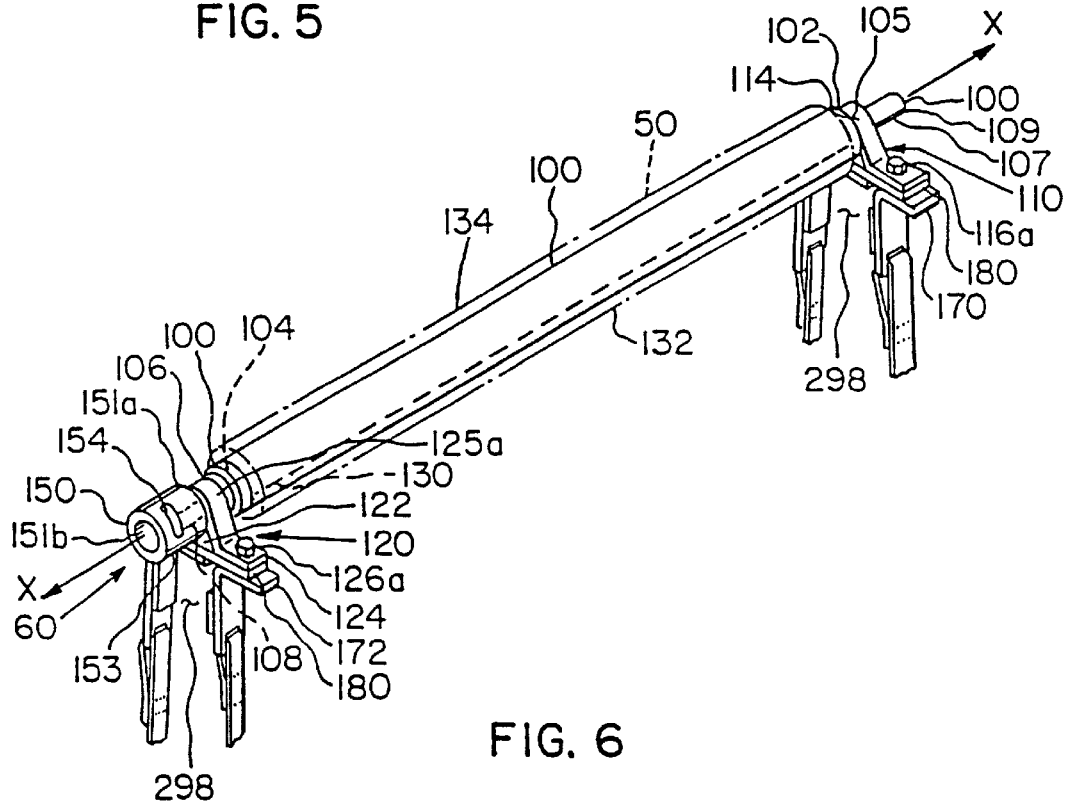
FIG. 6 is a perspective view of a portion of the unloading device of FIG. 1.

A locking arrangement 400, shown in phantom in FIG. 4, can be used to keep the tailgate 14 in an open position. Specifically, the locking arrangement 400 includes a strap portion 410 extending from lower portion 284 of strap 282. A self-locking buckle 420, such as the previously described tourniquet buckle or cam buckle, fixedly attaches to a free end 430 of the strap portion 410. A second strap portion 440 has one end 450 removably received by the buckle 420. The other end of the second strap portion has a hook 460 attached thereto. Hook 460 is received by an inner portion of the bumper 15 and the end 450 of second strap portion 440 is pulled taut. This insures that the tailgate 14 is maintained in the open position during operation of the unloader 30.

Figure 11:
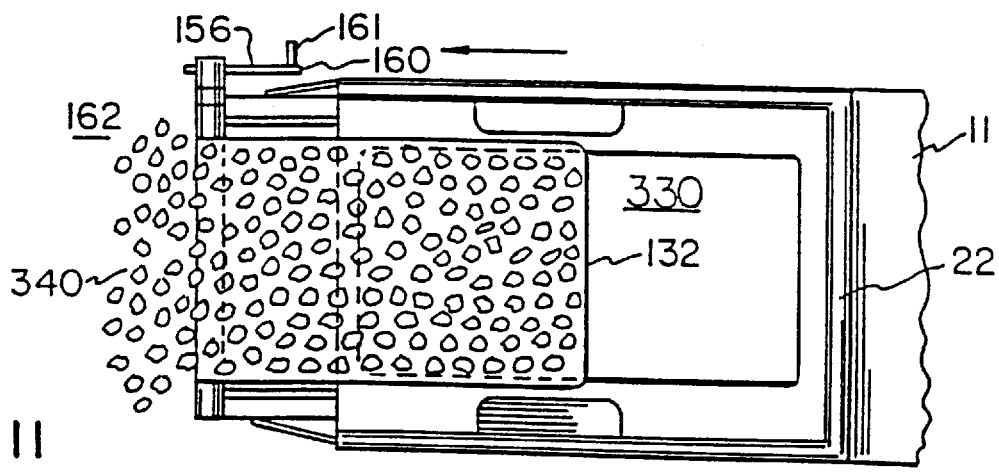
FIG. 11 is the pickup truck of FIG. 10 with the belt partially extended and depositing the bulk material on the ground.

Crank handle end 158 is then placed in coupling slot 154. The operator then grasps the gripping extension 161 of the crank handle 156 and rotates the handle in a clockwise direction about a longitudinal axis "X" passing through roller 100. This causes the belt 50 to wind around the roller 100 thereby moving the belt second end 132 toward the roller 100 and coacting or sliding on top of underlayment 80. Likewise, this causes bulk material 340 to move toward the roller 100 and onto the ground 162, as shown in FIG. 11. The truck bed is emptied of the material 340 when the belt 50 is completely wound onto the roller 100. The crank handle 156 and the second strap portion 440 of the locking arrangement 400 are then removed and the tailgate 14 is closed.

The belt 50 can then be extended again to the back end 22 of the bed 12 for receipt of a new load of material. Alternatively, the material 340 can be partially emptied from the truck 10 at a first site and then the remainder can be emptied at a second site.

It should now be evident that unloader 30 is much easier to operate and install than that described in the prior art. Further, unloader 30 is much simpler and less expensive to manufacture than those described in the prior art.

FIGS. 12–22 show a second unloader 30'. Unloader 30' is similar to unloader 30 except for the below noted differences. Thus, like reference numerals will be used for like parts.

Figure 12:
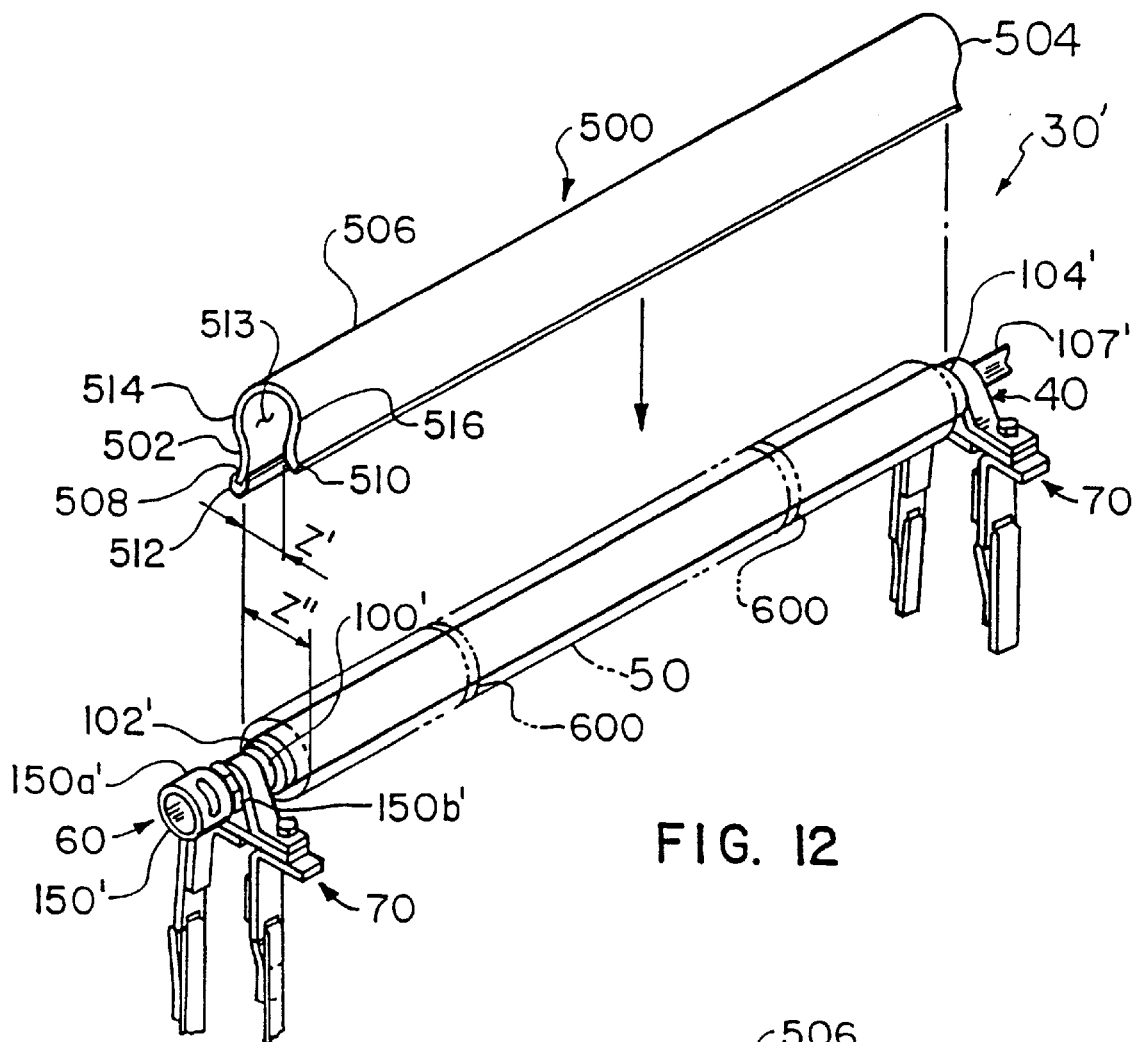
FIG. 12 is a perspective view of a second embodiment of an unloading device made in accordance with the present invention.

As shown in FIG. 12, the unloader 30' is adapted to attach to the tailgate of a pickup truck 10. The unloader includes a roller assembly 40, a belt 50, a driving arrangement 60 and an attaching arrangement 70. An optional removable underlayment 80, the same as underlayment shown in FIG. 2, can be positioned on the pickup bed. Unloader 30' operates in the same manner as unloader 30.

Unloader 30' includes a roller 100' having a 1.25" inch outer diameter with a ⅛" inch wall thickness. Inner surfaces of roller 100' near ends 102' and 104' have a flash control limit weld of approximately 0.005" inches. Shafts 107' and 108' are made of one inch diameter rod. A portion of shafts 107' and 108' are slidably received by roller 100' at ends 102' and 104'. The shafts 107' and 108', which extend from roller 100', are secured to the roller ends 102' and 104' by welding (see FIG. 13). Couplings 105 and 106 of unloader 30 are thereby eliminated by this arrangement. Further, this arrangement reduces the weight of the unloader 30' by approximately 10 pounds and it increases the mechanical advantage of the unloader by approximately 40% over the unloader 30.

Coupling 150', to which the handle 156 is removably secured in the same manner as coupling 150, is threadably received by an externally threaded end of shaft 108'. Coupling 150' includes a cylindrical portion 150a' that threadably receives a 1.25"×¾ bushing 150b' (see FIGS. 12 and 14). The bushing includes external threads for threadably engaging with internal threads of cylindrical portion 150a' and internal threads 151a' for threadably engaging with external threads 151b' of shaft 108'. Alternatively, coupling 150' can be one integral piece. Coupling 150' can be made of cast iron. However, it appears that the internal threads at 151a' could strip when the requisite torque is applied to operate the unloader 30'. I believe that this is due to the fact that ¾" National Pipe Thread (NPT) threads are formed on shaft 108' to accept the 1.25"×¾" threaded bushing 150b', which forms a part of coupling 150'. The external threads formed on shaft 108' (see FIG. 14) are partially or not fully formed on the one inch diameter shaft. (According to ASA standard 82.1-1960, the outside pipe diameter on a ¾" nominal pipe is 1.050 inches and the required diameter for effective thread engagement is 1.017", which is greater than the 1.000" diameter for shaft 108'.) I have found that by changing the bushing 150b' to a forged steel bushing from a cast iron bushing, the stripping problem due to the partially formed threads is eliminated. A torque of two hundred foot pounds can be applied to the bushing without stripping. This is substantially greater than the typical seventy to one hundred foot pounds needed to be applied by the handle 156 to operate the roller 100.

FIGS. 12 and 15–22 show an open ended substantially U-shaped resilient cover 500 that is adapted to be received by the unloader 30'. Cover 500 can be made of a polymeric material, such as plastic or fiberglass. Cover 500 includes two legs 502 and 504 extending from a base portion 506. Leg 502 is longer than leg 504. Legs 502 and 504 having outwardly extending ends 508 and 510. A U-shaped clip member 512 is received by the end 508 of leg 502. A belt and roller receiving cavity 513 is defined by legs 502, 504 and base portion 506. The cover 500 is adapted to be secured to the roller 100'. The cavity 513 is adapted to receive at least a portion of the roller 100' and a portion of the belt 50 wound around the roller 100'.

Figure 22:
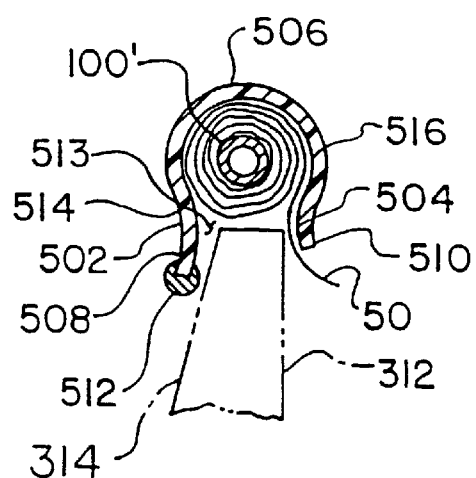
FIG. 22 is a sectional view of the cover shown in FIG. 15 secured to the unloading device shown in FIG. 12.
Figure 13:
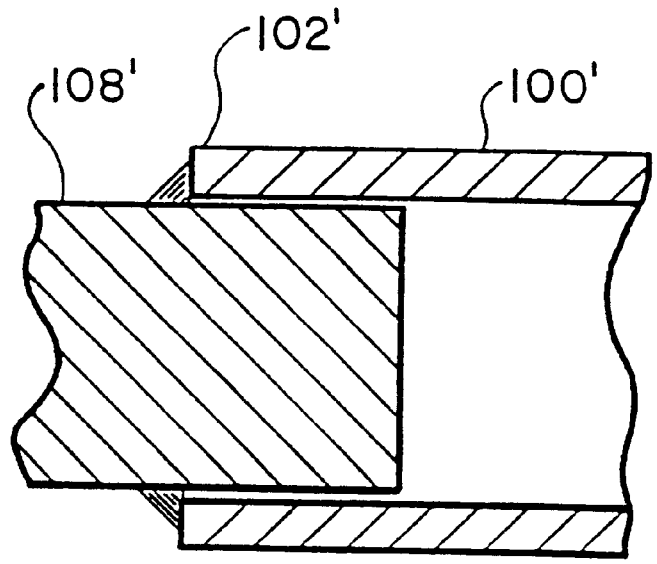
FIG. 13 is a sectional view of a portion of a roller and a shaft of the unloader shown in FIG. 12.
Figure 14:
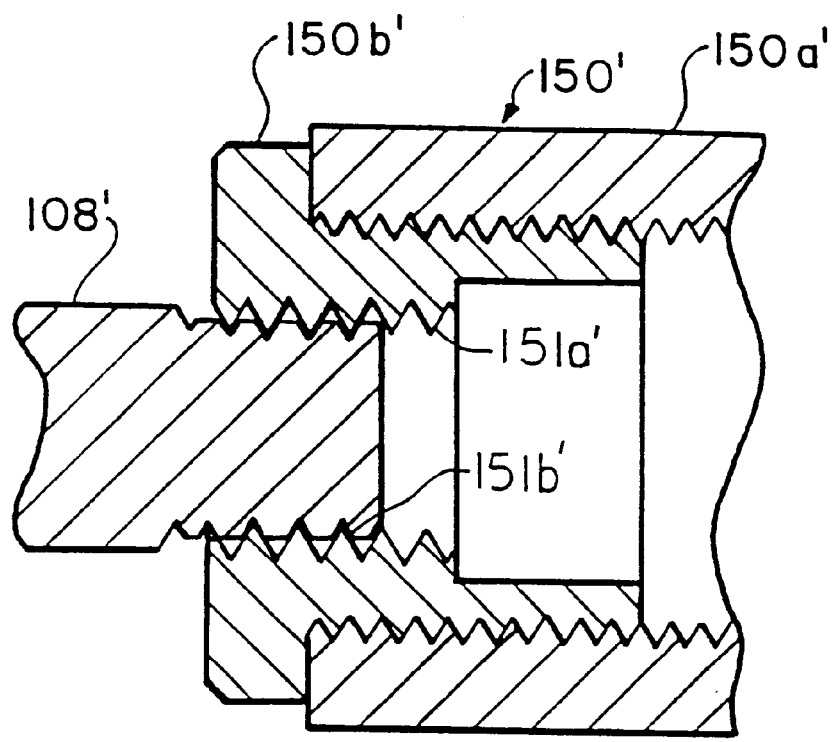
FIG. 14 is a sectional view of a portion of the shaft shown in FIG. 13 and a bushing of the unloader shown in FIG. 12.
Figure 17:
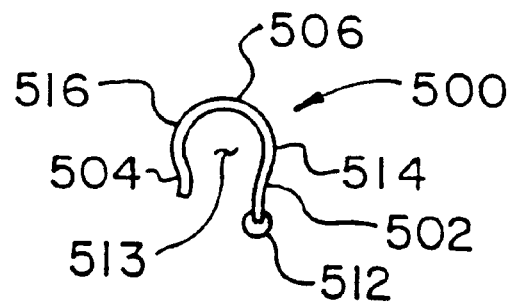
FIG. 17 is an end view of the cover shown in FIG. 15.
Figure 16:
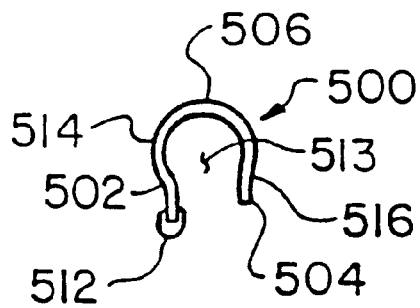
FIG. 16 is an end view of the cover shown in FIG. 15.
Figure 15:
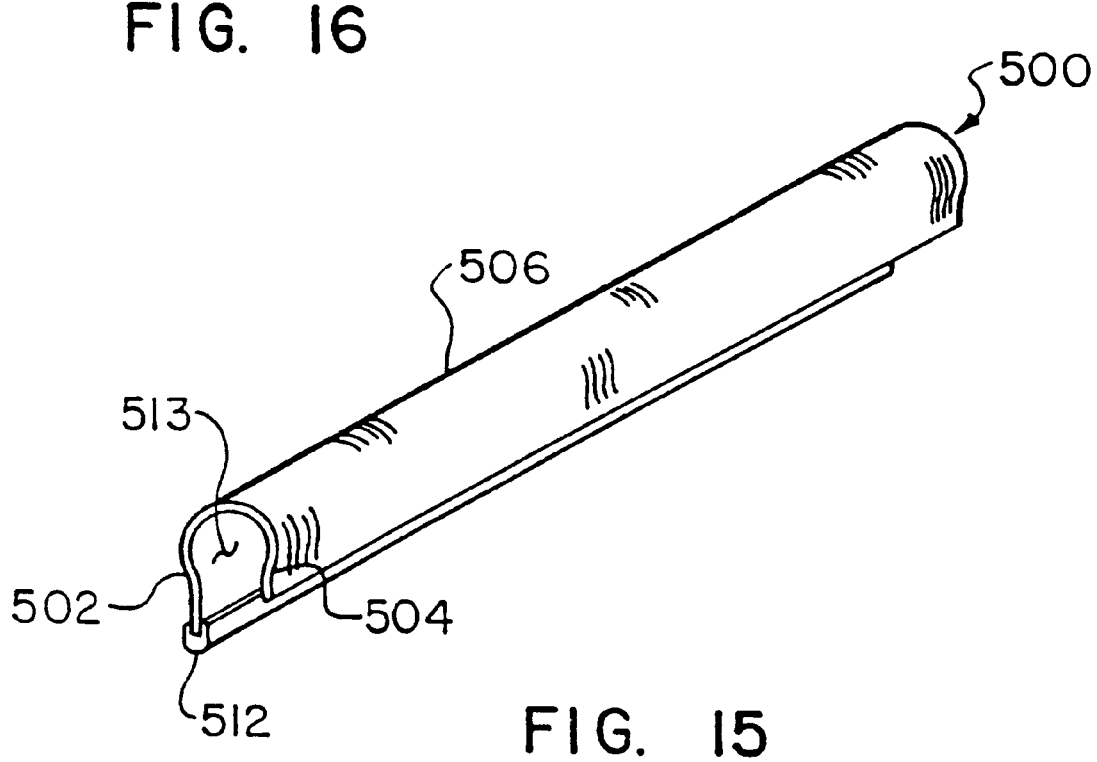
FIG. 15 is a perspective top view of a cover for the unloading device shown in FIG. 12.
Figure 18:
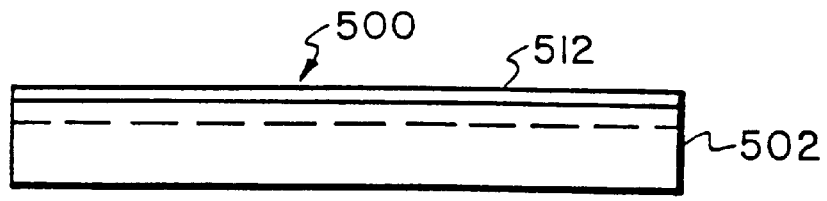
FIG. 18 is a back view of the cover shown in FIG. 15.
Figure 19:
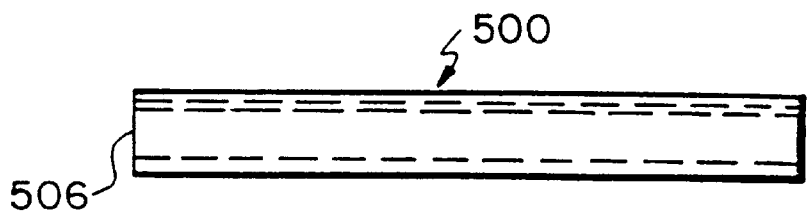
FIG. 19 is a top view of the cover shown in FIG. 15.
Figure 20:
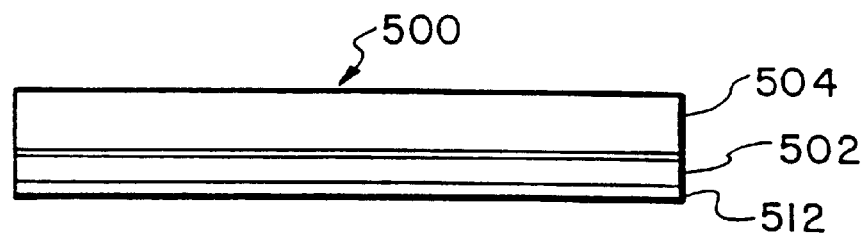
FIG. 20 is a front view of the cover shown in FIG. 15.
Figure 21:
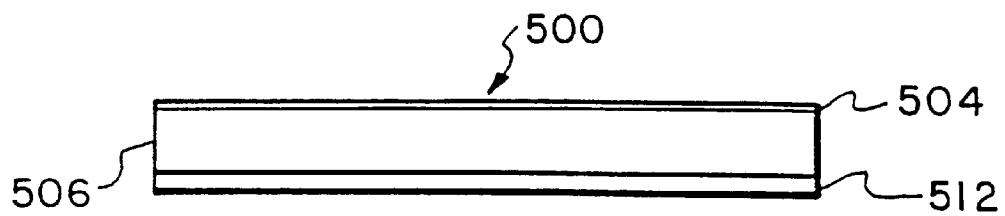
FIG. 21 is a bottom view of the cover shown in FIG. 15.

Legs 502 and 504 also include middle portions 514 and 516 that are spaced a distance "Z'" apart. The distance "Z'" is preferably less than the diameter "Z''" of the roller 100' and belt 50 in a completely wound state around the belt 50 as shown in FIG. 12. In operation cover 500 is slipped over the completely wound belt 50 and roller 100', which are then received within the cavity 513. Leg 502 is positioned adjacent the outer tailgate surface 314 and leg 504 is positioned adjacent inner tailgate surface 312 (see FIG. 22 where surfaces 312 and 314 are shown in phantom). The cover 500 is held in place, by middle portions 514 and 516 of cover 500 which form an interference fit with the wound belt 50 as shown in FIG. 22. The cover 500 is then removed when the belt 50 is unwound in the truck bed for receipt of the bulk material. The cover 500 can then be placed back over the roller 100' and remaining belt 50 wound around the roller when the tailgate 14 is in the closed position. When the bulk material 340 is to be emptied, the cover 500 is again removed.

Cover 500 provides an attractive appearance to the unloader 30'. Further, cover 500 acts as a clip for the belt 50 in the wound state, thereby preventing the belt from unwinding. Furthermore, cover 500 prevents the belt 50 from flapping in the wind when the belt is unwound and material 340 is resting on the belt 50 and the tailgate is in a closed position. Cover 500 can be sold in a kit with unloaders 30 or 30' with or without the underlayment 80.

As shown in FIG. 12, travel straps 600 can also be provided. Each strap 600 includes Velcro® fasteners on its end. Each strap 600 is wrapped around the belt 50 in the wound state and is tightly secured thereto by connecting the respective fastener ends to each other, in a manner well known in the art. This further prevents the belt from unwinding.

Having described the presently preferred embodiments of the invention, it is to be understood that it may otherwise be embodied within the scope of the appended claims.

I claim:

1. In a vehicle having a vehicle flat bed with a back end, opposite sides spaced a distance apart and a tailgate hinged to the bed for movement between an open position and a closed position, the tailgate having a length, a width, an upper end and a lower end, the lower end spaced a distance from the bed, and two outer surfaces, the improvement comprising:

an unloader comprising:

a roller having a length substantially equal to the length of the tailgate, said roller having a first end and a second end;

a flat flexible belt having an underside adapted to slide along a sliding surface in the bed attached to said roller and having a length sufficient for extending from said roller into at least a portion of said flat bed, said belt adapted to be wound onto said roller;

an attaching bracket pivotally attached to said first end of said roller;

a flexible strap member, said strap member attached to said attaching bracket and including a buckling end and a buckle end, said buckle end having a buckle attached thereto, said strap member passing under the lower end of the tailgate through the space between the tailgate and the bed, so that said roller is attached to the tailgate and is positioned adjacent the upper end of the tailgate by buckling said buckling end to said buckle; and a handle attached to said roller for rotating said roller, whereby an object or material placed upon the flexible belt when extended into the flat bed area can be moved toward said roller when said roller is rotated, rotation of said roller causing said belt to be wound onto said roller.

2. In a vehicle having a vehicle flat bed with a back end, opposite sides spaced a distance apart and a tailgate hinged to the bed for movement between an open position and a closed position, the tailgate having a length, a width, an upper end and a lower end, the lower end spaced a distance from the bed, and two outer surfaces, the improvement comprising:

an unloader comprising:

a roller having a length substantially equal to the length of the tailgate, said roller having a first end and a second end;

a flat flexible belt having an underside adapted to slide along a sliding surface in the bed attached to said roller and having a length sufficient for extending from said roller into at least a portion of said flat bed, said belt adapted to be wound onto said roller;

an attaching bracket pivotally attached to said first end of said roller;

a flexible strap member, said strap member attached to said attaching bracket and including a buckling end and a buckle end, said buckle end having a buckle attached thereto, said strap member passing under the lower end of the tailgate through the space between the tailgate and the bed, so that said roller is attached to the tailgate and is positioned adjacent the upper end of the tailgate by buckling said buckling end to said buckle;

a handle attached to said roller for rotating said roller, whereby an object or material placed upon the flexible belt when extended into the flat bed area can be moved toward said roller when said roller is rotated, rotation of said roller causing said belt to be wound onto said roller; and an open ended cover secured to said roller, said cover defining a cavity for receiving a portion of said belt wound on said roller.

3. The apparatus of claim 2 wherein said cover is substantially U-shaped.

4. An apparatus for conveying materials from a vehicle flat bed having a back end, opposite sides spaced a distance apart and a tailgate hinged to the bed for movement between an open position and a closed position, the tailgate having a length, a width, an upper end and a lower end, the lower end spaced a distance from the bed, and two outer surfaces, said apparatus comprising:

a roller having a length substantially equal to the length of the tailgate, said roller having a first end and a second end;

a shaft extending from said roller, said shaft having external partially formed threads;

a forged steel bushing having internal threads, said bushing internal threads threadably receiving said shaft external threads;

a flat flexible belt having an underside for sliding along a sliding surface in the bed attached to said roller and having a length sufficient for extending from said roller into at least a portion of said flat bed, said belt adapted to be wound onto said roller;

an attaching bracket pivotally attached to said first end of said roller so that said roller can be attached to the tailgate and positioned adjacent the upper end of the tailgate; and a handle secured to said bushing and attached to said roller through said bushing and said shaft, whereby an object or material placed upon the flexible belt when extended into the flat bed area can be moved toward said roller when said roller is rotated, rotation of said roller causing said belt to be wound onto said roller.

5. An apparatus for conveying materials from a vehicle flat bed having a back end, opposite sides spaced a distance apart and a tailgate hinged to the bed for movement between an open position and a closed position, the tailgate having a length, a width, an upper end and a lower end, the lower end spaced a distance from the bed, and two outer surfaces, said apparatus comprising:

a roller having a length substantially equal to the length of the tailgate, said roller having a first end and a second end;

a flat flexible belt having an underside for sliding along a sliding surface in the bed attached to said roller and having a length sufficient for extending from said roller into at least a portion of said flat bed, said belt adapted to be wound onto said roller;

a removable handle attached to said roller, whereby an object or material placed upon the flexible belt when extended into the flat bed area can be moved toward said roller when said roller is rotated, rotation of said roller causing said belt to be wound onto said roller; and an attaching bracket pivotally attached to said first end of said roller, so that said roller can be attached to the tailgate and positioned adjacent the upper end of the tailgate wherein said attaching bracket includes:

a mounting plate having a length greater than the width of the upper end of the tailgate, said mounting plate having an upper surface and a lower surface, said mounting plate lower surface adapted to be positioned adjacent to the upper end of the tailgate, said mounting plate having a first end and a second end with a first hole passing through said mounting plate adjacent said mounting plate first end and a second hole passing through said mounting plate adjacent said mounting plate second end, a first L-shaped bracket and a second L-shaped bracket, each of said L-shaped brackets having a first leg and a second leg depending therefrom, each first leg having a hole passing therethrough, and two fasteners, each fastener passing through a respective mounting plate hole and L-shaped bracket hole and attaching said mounting plate to said respective L-shaped bracket so that said second legs of said first L-shaped bracket and said second L-shaped bracket are adapted to be positioned adjacent to respective outer sides of the tailgate and said first legs of said first L-shaped bracket and said second L-shaped bracket are adapted to depend away from the tailgate.

6. The apparatus as claimed in claim 5, wherein at least one of said first hole of said mounting plate and said hole of said first L-shaped bracket first leg are elongated so that the distance between said L-shaped bracket second leg can be varied and said attaching bracket can accommodate different tailgate thickness.

7. The apparatus as claimed in claim 6, wherein a cushion is attached to at least one of said lower surface of said mounting plate, an inner surface of said second leg of said first L-shaped bracket and an inner surface of said second leg of said second L-shaped bracket.

8. An apparatus for conveying materials from a vehicle flat bed having a back end, opposite sides spaced a distance apart and a tailgate hinged to the bed for movement between an open position and a closed position, the tailgate having a length, a width, an upper end and a lower end, the lower end spaced a distance from the bed, and two outer surfaces, said apparatus comprising:

a roller having a length substantially equal to the length of the tailgate, said roller having a first end and a second end;

a flat flexible belt having an underside for sliding along a sliding surface in the bed attached to said roller and having a length sufficient for extending from said roller into at least a portion of said flat bed, said belt adapted to be wound onto said roller;

an attaching bracket pivotally attached to said first end of said roller, so that said roller can be attached to the tailgate and positioned adjacent the upper end of the tailgate;

a removable handle attached to said roller, whereby an object or material placed upon the flexible belt when extended into the flat bed area can be moved toward said roller when said roller is rotated, rotation of said roller causing said belt to be wound onto said roller; and a shaft extending from said roller, said shaft having external partially formed threads, and a forged steel bushing having internal threads, said bushing internal threads threadably receiving said shaft external threads, wherein said handle is secured to said bushing.

* * * * *